United States Patent
Adachi et al.

(10) Patent No.: US 9,960,577 B2
(45) Date of Patent: May 1, 2018

(54) WIRING HARNESS AND ROUTING STRUCTURE OF THE SAME

(71) Applicant: Yazaki Corporation, Tokyo (JP)

(72) Inventors: Hideomi Adachi, Kosai (JP); Hidehiko Kuboshima, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days. days.

(21) Appl. No.: 13/786,811

(22) Filed: Mar. 6, 2013

(65) Prior Publication Data

US 2013/0192890 A1 Aug. 1, 2013

Related U.S. Application Data

(63) Continuation of application No. PCT/JP2011/074239, filed on Oct. 14, 2011.

(30) Foreign Application Priority Data

Oct. 15, 2010 (JP) .................................. 2010-232067

(51) Int. Cl.
*H02G 3/04* (2006.01)
*B60R 16/02* (2006.01)

(52) U.S. Cl.
CPC ....... *H02G 3/0406* (2013.01); *B60R 16/0215* (2013.01); *H02G 3/0487* (2013.01)

(58) Field of Classification Search
CPC .................................................. H02G 3/0406
(Continued)

(56) References Cited

U.S. PATENT DOCUMENTS 3,544,706 A * 12/1970 Moisson-Franckhauser .......... H01B 7/18
174/125.1
3,798,346 A 3/1974 Kreuzer
(Continued)

FOREIGN PATENT DOCUMENTS

CN 1521058 A 8/2004
CN 1309593 C 4/2007
(Continued)

OTHER PUBLICATIONS

International Search Report dated Dec. 12, 2012, issued for PCT/JP2011/074239.
(Continued)

*Primary Examiner* — Dhirubhai R Patel
(74) *Attorney, Agent, or Firm* — Locke Lord LLP (57) ABSTRACT

To provide a wiring harness and a routing structure of the wiring harness able to prevent high temperature and its influence caused by heat generation. A wiring harness includes a harness main body having a plurality of high voltage conducting lines. The high voltage conducting lines are arranged with gaps between the adjacent high voltage conducting lines. Further, the plurality of high voltage conducting lines are arranged to maintain an interval as the gap. It becomes a routing structure of the wiring harness when curved portions of such high voltage conducting lines are directly or indirectly made contact with a shield cover covering the wiring harness. Because the high voltage conducting lines of the wiring harness are arranged with gaps between the adjacent high voltage conducting lines, radiation performance of the wiring harness is better than the wiring harness of which high voltage conducting lines are bundled.

2 Claims, 5 Drawing Sheets (58) Field of Classification Search
USPC .............................................. 174/72 A, 72 B
See application file for complete search history.

(56) References Cited

U.S. PATENT DOCUMENTS

| | | | | |
|---|---|---|---|---|
| 4,219,928 | A | * | 9/1980 | Kuo ................................ 29/868 |
| 4,313,029 | A | | 1/1982 | Bunish |
| 4,600,805 | A | | 7/1986 | Glynn et al. |
| 5,600,099 | A | * | 2/1997 | Crotzer et al. ................ 174/257 |
| 5,909,012 | A | * | 6/1999 | Todd et al. .................... 174/266 |
| 6,051,790 | A | * | 4/2000 | Takeuchi ............ B60R 16/0207 174/70 R |
| 7,172,042 | B2 | | 2/2007 | Yamaguchi et al. |
| 7,449,639 | B2 | * | 11/2008 | Nair ..................... H01B 7/0876 174/113 R |
| 2005/0045357 | A1 | | 3/2005 | Ichikawa et al. |
| 2008/0135273 | A1 | | 6/2008 | Siems |
| 2008/0173463 | A1 | | 7/2008 | Yamada et al. |
| 2010/0147505 | A1 | * | 6/2010 | Manke et al. ................ 166/66.4 |

FOREIGN PATENT DOCUMENTS

| | | |
|---|---|---|
| DE | 3611128 A1 | 10/1987 |
| EP | 1150304 A1 | 10/2001 |
| JP | S61-201210 U | 12/1986 |
| JP | H03101008 A | 4/1991 |
| JP | 2003-115223 A | 4/2003 |
| JP | 2005080449 A | 3/2005 |
| JP | 2007335379 A | 12/2007 |
| JP | 2008177111 A | 7/2008 |
| JP | 2010027577 A | 2/2010 |

OTHER PUBLICATIONS

Office Action dated Jan. 28, 2016 issued for corresponding Chinese Patent Application No. 201180049827.6.
Office Action drafted on Jun. 6, 2014 issued for corresponding Japanese Patent Application No. 2010-232067.
Office Action drafted on Sep. 8, 2014 issued for corresponding Japanese Patent Application No. 2010-232067.
Office Action drafted on Feb. 3, 2015 issued for corresponding Japanese Patent Application No. 2010-232067.

* cited by examiner

WIRING HARNESS AND ROUTING STRUCTURE OF THE SAME

TECHNICAL FIELD

This invention relates to a high voltage wiring harness and a routing structure of this wiring harness.

BACKGROUND ART

In an electric vehicle or a hybrid vehicle, a motor unit and an inverter unit mounted on these vehicles are connected using a high current and high voltage wiring harness (for example, see Patent Document 1 listed below). Electromagnetic wave shield is made on the high current and high voltage wiring harness.

PRIOR ART DOCUMENT

Patent Document

Patent Document 1: JP, A, 2003-115223

DISCLOSURE OF THE INVENTION

Problem to be Solved by the Invention

When the electromagnetic wave shield is made on the wiring harness by covering a wiring harness main body of the wiring harness with a shield member as a block, typically, a plurality of high voltage electric wires composing the harness main body is bundled. However, there is a fear that the heat generated by bundled high voltage electric wires makes the wiring harness high temperature. When the wiring harness becomes high temperature, there is a fear that an area around the wiring harness is affected.

Accordingly, in view of the above situation, an object of the present invention is to provide a wiring harness and a routing structure of the wiring harness able to prevent high temperature and its influence caused by heat generation.

Means for Solving the Problem

For attaining the object, according to the invention claimed in claim 1, there is provided a wiring harness comprising:

a harness main body including a plurality of high voltage conducting lines arranged with gaps therebetween, each of said lines having a conductor and an insulator covering the conductor.

According to the present invention having such a character, radiation performance is increased by having a gap, namely, an interval between the high voltage conducting lines adjacent to each other. According to the present invention, by keeping the interval as the gap, good radiation performance is maintained.

According to the invention claimed in claim 2, there is provided the wiring harness as claimed in claim 1, wherein the high voltage conducting line is formed so as to be able to maintain an arbitrary shape.

According to the present invention having such a character, the interval between the high voltage conducting lines adjacent to each other is kept by maintaining their shapes, and the radiation performance is further surely maintained.

For attaining the object, according to the invention claimed in claim 3, there is provided a routing structure of a wiring harness comprising:

the wiring harness as claimed in claim 1 or 2; and a conductive shield cover covering the wiring harness, wherein a part of the high voltage conductive lines of the harness main body of the wiring harness directly or indirectly contacts the shield cover.

According to the present invention having such a character, a part of the high voltage conductive lines of the harness main body of the wiring harness directly or indirectly contacts the shield cover. Thereby, the heat at the wiring harness side is transferred to the shield cover side to radiate the heat.

Effects of the Invention

According to the invention claimed in claim 1, the high temperature of the wiring harness and its influence caused by the heat generation of the high voltage conducting lines is prevented.

According to the invention claimed in claim 2, by increasing the radiation performance, the high temperature of the wiring harness is further surely prevented.

According to the invention claimed in claim 3, the routing structure of a wiring harness able to prevent the high temperature and its influence caused by the heat generation can be provided.

DESCRIPTION OF EMBODIMENTS

A wiring harness of the present invention includes a harness main body having a plurality of high voltage conducting lines. The high voltage conducting lines are arranged with gaps between the high voltage conducting lines adjacent to each other. Further, the plurality of high voltage conducting lines is arranged so that an interval as a gap therebetween is maintained. According to the routing structure of the wiring harness of the present invention, a part of the high voltage conducting lines directly or indirectly contacts a shield cover covering the wiring harness.

The wiring harness described above is directed to a hybrid vehicle or an electric vehicle. Hereinafter, an example of the hybrid vehicle will be explained. (In a case of the electric vehicle, a constitution, a structure, and an effect of the routing structure of the wiring harness and the shield cover according to the present invention are basically the same. Incidentally, the present invention can be used in not only the hybrid vehicle or the electric vehicle, but also a normal vehicle or the like.)

Figure 1:
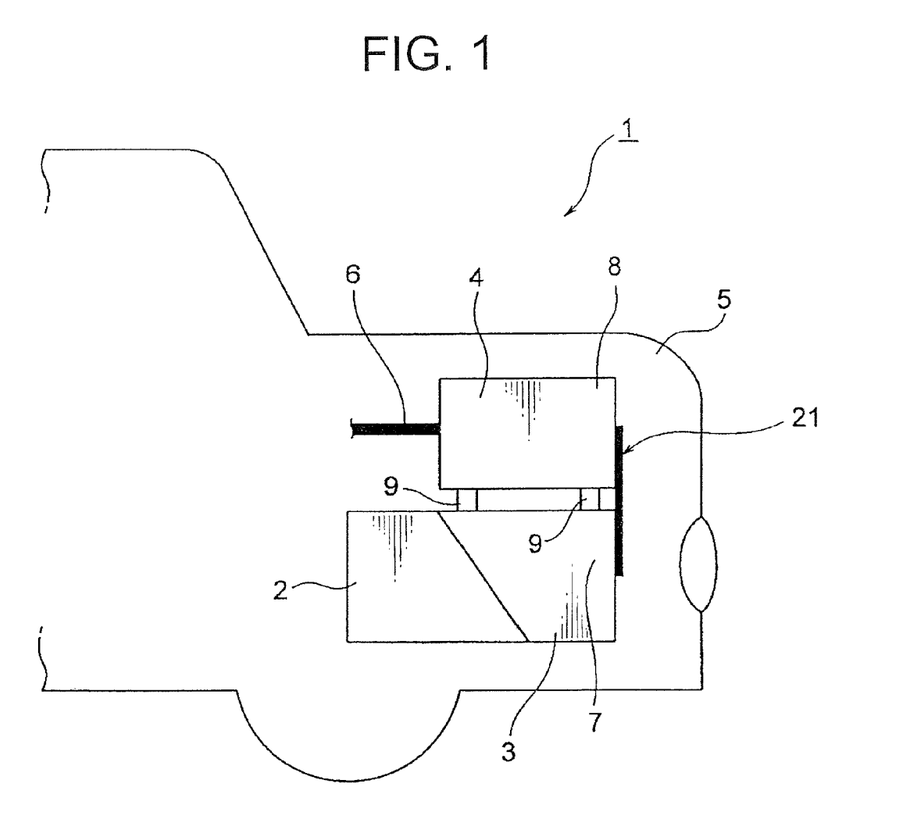
FIG. 1 Schematic view showing a hybrid vehicle using a wiring harness and a routing structure of the wiring harness according to the present invention.

FIG. 1 is a schematic view showing a hybrid vehicle using the wiring harness and the routing structure of the wiring harness according to the present invention.

In FIG. 1, reference sign 1 denotes the hybrid vehicle. The hybrid vehicle 1 is a vehicle driven by a mixture of an engine 2 and a motor unit 3. Electric power is supplied to the motor unit 3 via an inverter unit 4 from a not-shown battery (battery pack). The engine 2, the motor unit 3, and the inverter unit 4 are mounted on an engine room 5 arranged at a position where a front wheel is provided in this embodiment. Further, the not-shown battery is mounted on a rear side of a vehicle at a position where a vehicle interior or a rear wheel is provided located behind the engine room 5.

The motor unit 3 and the inverter unit 4 are connected to each other with a routing structure of a high voltage wiring harness 22 (including a later-described wiring harness 22) according to the present invention. Further, the not-shown battery and the inverter unit 4 are connected to each other with a high voltage wiring harness 6. For example, the wiring harness 6 is routed from the engine room 5 to an underfloor space at a ground side of a floor panel.

Here, a supplemental explanation of this embodiment will be done. The motor unit 3 includes a motor and a generator. The inverter unit 4 includes an inverter and a converter. The motor unit 3 is formed as a motor assembly having a shield case 7. Further, the inverter unit 4 is also formed as an inverter assembly having a shield case 8. The not-shown battery is a battery module of Ni-MH or Li-ion. Incidentally, a storage device such as a capacitor can be used. The not-shown battery is not limited as long as it can be used in the hybrid vehicle 1 or an electric vehicle.

In this embodiment, the inverter unit 4 is arranged and fixed right above the motor unit 3. Namely, the inverter unit 4 and the motor unit 3 are arranged close to each other. Because of such an arrangement, the routing structure of the wiring harness 21 and the wiring harness 22 (see FIGS. 2A and 2B) are short. Regarding the inverter unit 4 and the motor unit 3, reference sign 9 denotes a fixing leg for arranging and fixing the inverter unit 4 right above the motor unit 3.

Hereinafter, an embodiment of the routing structure 21 of the wiring harness 22 and the wiring harness 22 will be explained.

Embodiment 1

Figure 2A:
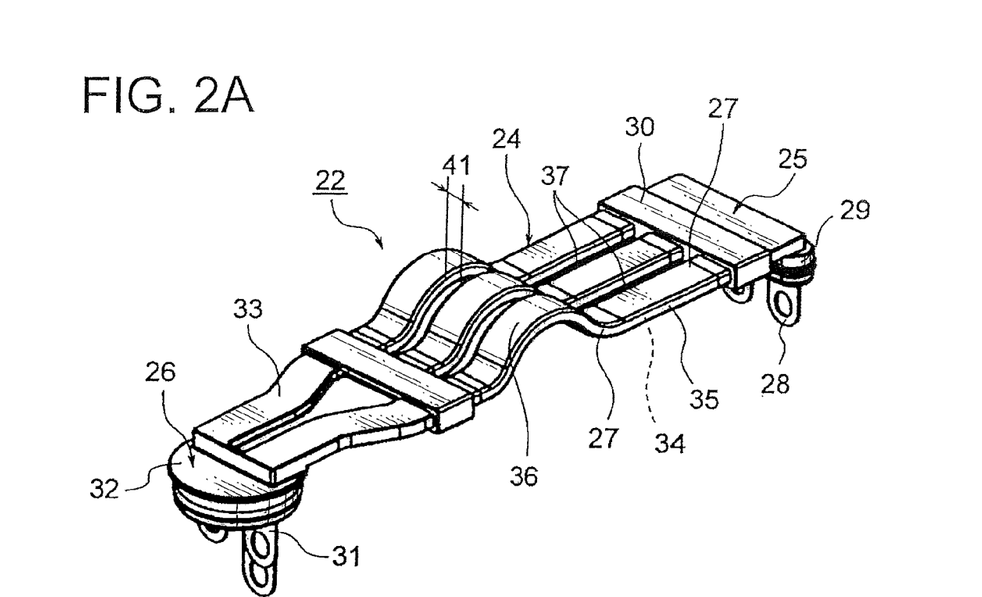
FIG. 2A A perspective view showing the wiring harness.
Figure 2B:
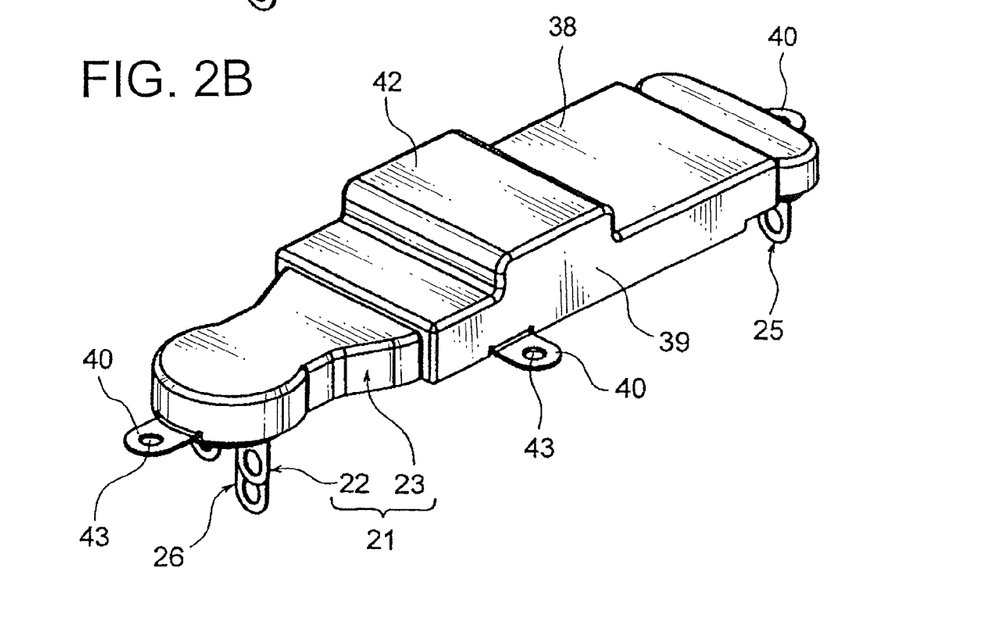
FIG. 2B A perspective view showing the routing structure of the wiring harness (embodiment 1).
Figure 3A:
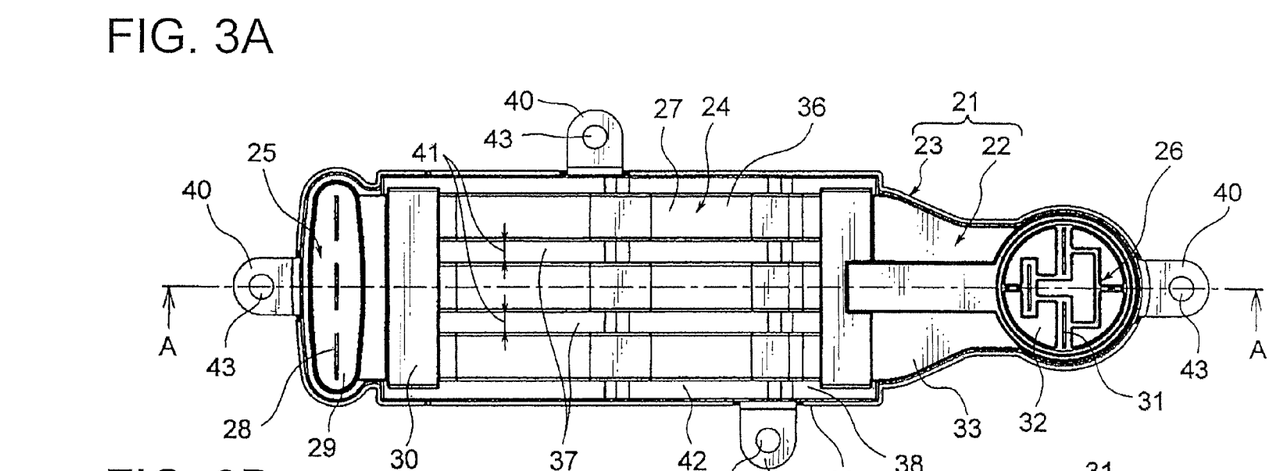
FIG. 3A A bottom view showing the routing structure of the wiring harness.
Figure 3B:
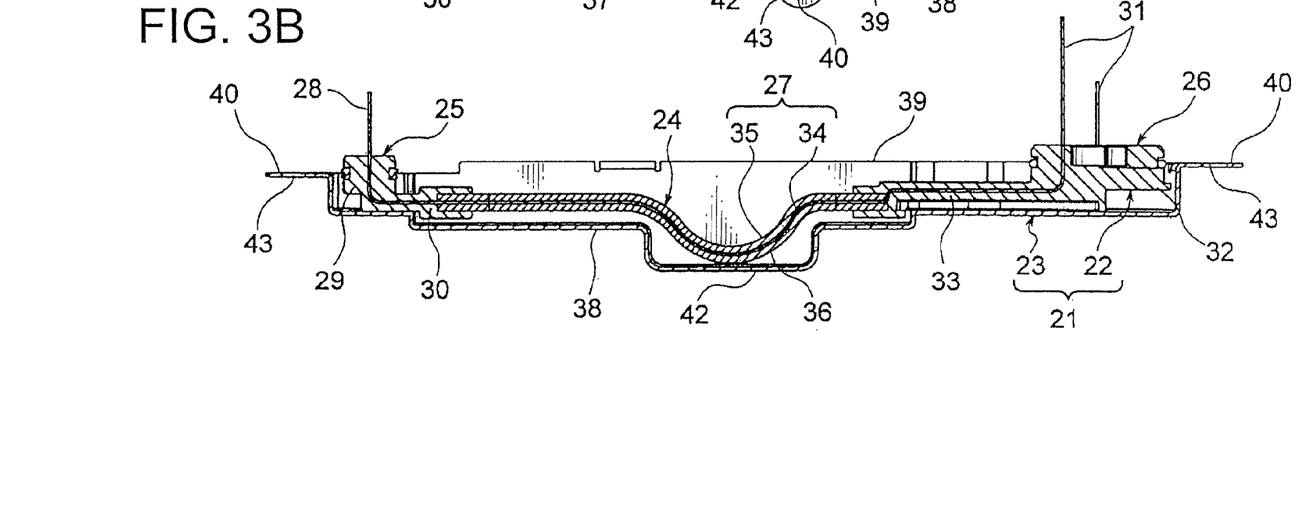
FIG. 3B A sectional view taken on line A-A of FIG. 3A.

Hereinafter, an embodiment 1 will be explained with reference to figures. FIG. 2A is a perspective view showing the wiring harness. FIG. 2B is a perspective view showing the routing structure of the wiring harness. FIG. 3A is a bottom view showing the routing structure of the wiring harness. FIG. 3B is a sectional view taken on line A-A of FIG. 3A.

As shown in FIGS. 2A to 3B, the routing structure 21 of the wiring harness 22 includes: the wiring harness 22; a shield cover 23 covering the wiring harness 22 for shielding electromagnetic wave; and a plurality of bolts (not shown) for connecting and fixing the shield cover 23 to the shield cases 7, 8 (see FIG. 1).

The wiring harness 22 includes: a harness main body 24; a motor-side connector 25 provided on one end of the harness main body 24; and an inverter-side connector 26 provided on the other end of the harness main body 24. The harness main body 24 includes a plurality of (three in this embodiment) high voltage conducting lines 27 arranged with gaps therebetween on substantially the same plane.

The motor-side connector 25 is inserted into the shield case 7 (see FIG. 1) of the motor unit 3, and electrically connected in an inside thereof. Similarly, the inverter-side connector 26 is inserted into the shield case 8 (see FIG. 1) of the inverter unit 4, and electrically connected in an inside thereof.

The motor-side connector 25 includes: a terminal 28; an insulating housing 29; and an overmolding portion 30 coupled to the housing 29, and overmolding the terminal 28 and a continuing portion of the high voltage conducting lines 27. Similarly, the inverter-side connector 26 includes: a terminal 31; an insulating housing 32; and an overmolding portion 33 coupled to the housing 32 and overmolding the terminal 31 and a continuing portion of the high voltage conducting lines 27.

Each high voltage conducting line 27 includes: a conductor 34; and an insulator 35 covering the conductor 34. One end and the other end of the conductor 34 are respectively coupled to the terminals 28, 31. In this embodiment, the conductor 34 is made by pressing a conductive metal plate (made of copper, copper alloy, or aluminum). Namely, the conductor 34 is formed in a bus bar shape (band plate shape) having a specific width and a specific thickness.

Incidentally, the shape of the conductor 34 is not limited to the bus bar shape. For example, a shape made by braiding element wires, or a bar shape having a rectangular or circular section may be used.

The insulator 35 is formed so as to protect the conductor 34 and to make the conductor 34 watertight or the like. The insulator 35 is made by overmolding using elastomer such as rubber or thermoplastic elastomer.

Each high voltage conducting line 27 of this embodiment has a curved portion 36. This curved portion 36 is formed so as to directly or indirectly contact the shield cover 23. The curved portion 36 is projected in substantially a half arc shape. Incidentally, the shape of the curved portion 36 is only one example. The shape of the curved portion 36 is not limited to a specific shape as long as it can directly or indirectly contact the shield cover 23.

Incidentally, if the curved portion 36 is not formed, the shield cover 23 may be projected so as to directly or indirectly contact the high voltage conducting lines 27.

When the curved portion 36 as a part of the high voltage conducting line 27 directly contacts the shield cover 23, the insulator 35 made of material having good abrasion resistance is used. Further, when the curved portion 36 indirectly contacts the shield cover 23, an intervening member having insulating property and abrasion resistance may be provided on the curved portion 36. For example, a twist tube, a tape, or the like can be used as the intervening member. The intervening member having the same function may be provided on the shield cover 23.

The plurality of high voltage conducting lines 27 are arranged with gaps 37 between the adjacent high voltage conducting lines 27. Further, the high voltage conducting lines 27 are arranged so as to maintain an interval 41 as the gap 37. The interval 41 as the gap 37 is designed in view of radiation performance.

Incidentally, for maintaining the interval 41, it is effective to use a firm material as the high voltage conducting line 27. If the high voltage conducting lines 27 are firm, for example, the high voltage conducting lines 27 can be arranged while maintaining shapes shown in figures.

If the conductor 34 as a component of the high voltage conducting line 27 is made of aluminum, the high voltage conducting line 27 becomes flexible and can maintain a curved shape. Namely, the high voltage conducting line 27 becomes firm. Further, if the conductor 34 is made of aluminum, the high voltage conducting line 27 becomes light weight.

The shield cover 23 is made of conductive metal for shielding the wiring harness 22 from electromagnetic wave, and formed in a shape so as to cover the whole wiring harness 22. In this embodiment, the shield cover 23 includes: a ceiling wall 38; a side wall 39 coupled to a peripheral edge of the ceiling wall 38; and a plurality of fixing portion 40 coupled to the side wall 39 at specific positions, and formed in a box shape as shown in figures.

A convex portion 42 is formed on the ceiling wall 38. Seeing from an outside, this convex portion 42 is formed so that a part of the ceiling wall 38 is projected (seeing from an inside, the convex portion 42 is formed in a concave shape). The curved portion 36 of the wiring harness 22 contacts an inner wall of the convex portion 42. When the curved portion 36 directly or indirectly contacts the inner will of the convex portion 42, the convex portion 42 absorbs the heat generated in the wiring harness 22, and the heat is radiated from substantially the whole shield cover 23.

A fixing portion 40 is provided for being screwed onto the shield case 7 of the motor unit 3 or the shield case 8 of the inverter unit 4 (see FIG. 1) and formed in a tongue shape having a screw hole 43.

The shield cover 23 is made by drawing a conductive metal plate, or by punching and folding a metal plate. Incidentally, the shield cover 23 of this embodiment is one-part constitution. However, the present invention is not limited to this. Two-part constitution such as a block construction may be used.

A connecting operation of the motor unit 3 and the inverter unit 4 using the wiring harness 22, and an assembling operation of the routing structure of the wiring harness will be explained based on the above constitution and structure with reference to FIGS. 1 to 3.

After the wiring harness 22 is produced, firstly, motor-side connector 25 of the wiring harness 22 is connected to the motor unit 3. At this time, the motor-side connector 25 penetrates the shield case 7. Further, electric connection is done in an inside of the shield case 7. Next, the inverter-side connector 26 of the wiring harness 22 is connected to the inverter unit 4. At this time, the inverter-side connector 26 penetrates the shield case 8. Further, electric connection is done in an inside of the shield case 8. Thus, the connecting operation of the wiring harness 22 is finished.

Next, the wiring harness 22 is covered with the shield cover 23, and fixed with screws. When covering the wiring harness 22 with the shield cover 23, an inner wall of the convex portion 42 of the shield cover 23 contacts the curved portion 36 of the wiring harness 22. Thereby, the heat generated in the wiring harness 22 can be radiated from substantially the whole shield cover 23. Regarding the radiation, because the plurality of high voltage conducting lines 27 of the wiring harness 22 are arranged with gaps 37 between the adjacent high voltage conducting lines 27, the radiation performance is of course better than the bundled high voltage conducting lines 27. Incidentally, because the inner wall of the convex portion 42 directly or indirectly contacts the curved portion 36, the wiring harness 22 becomes hard to be moved by being pressed by the inner wall.

Thus, the assembling operation of the routing structure 21 of the wiring harness 22 is finished, and the wiring harness 22 is shielded electromagnetically by the shield cover 23, and is prevented from an influence of noise.

Because the high voltage conducting lines 27 are arranged with gaps 37 between the adjacent high voltage conducting lines 27, the wiring harness 22 is prevented from high temperature and its influence caused by the heat generation. Further, because the wiring harness 22 directly or indirectly contacts the shield cover 23, the wiring harness 22 is further surely prevented from the high temperature caused by the heat generation.

Embodiment 2

Figure 4A:
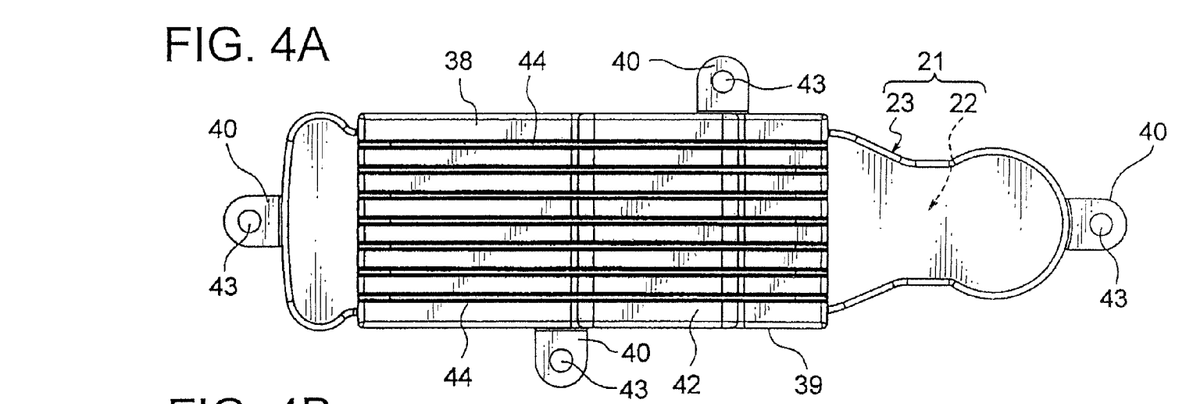
FIG. 4A A plan view showing the routing structure of the wiring harness according to another embodiment of the present invention.
Figure 4B:
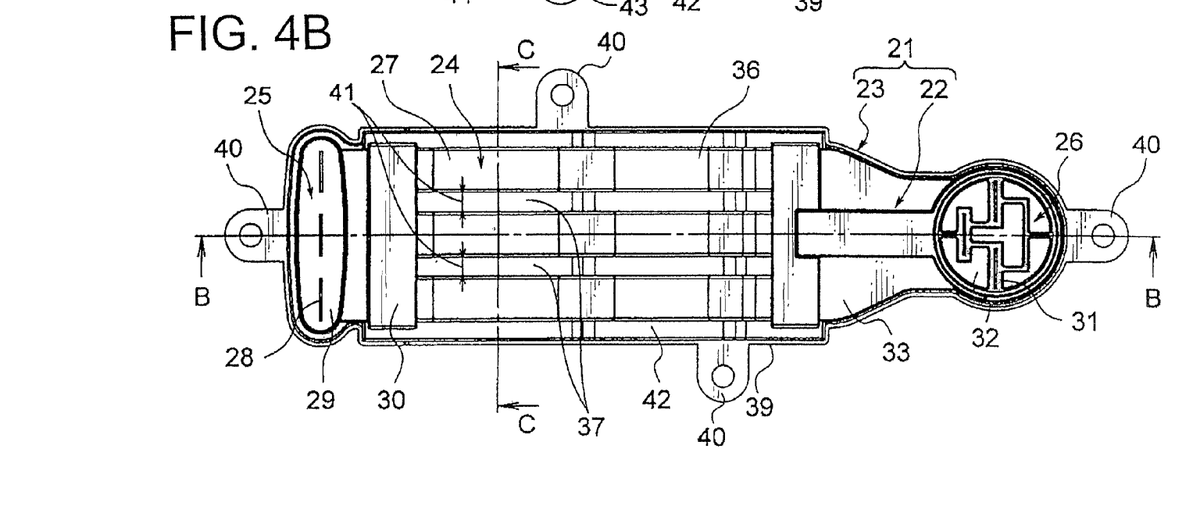
FIG. 4B A bottom view showing the routing structure of the wiring harness (embodiment 2).
Figures 5A, 5B:
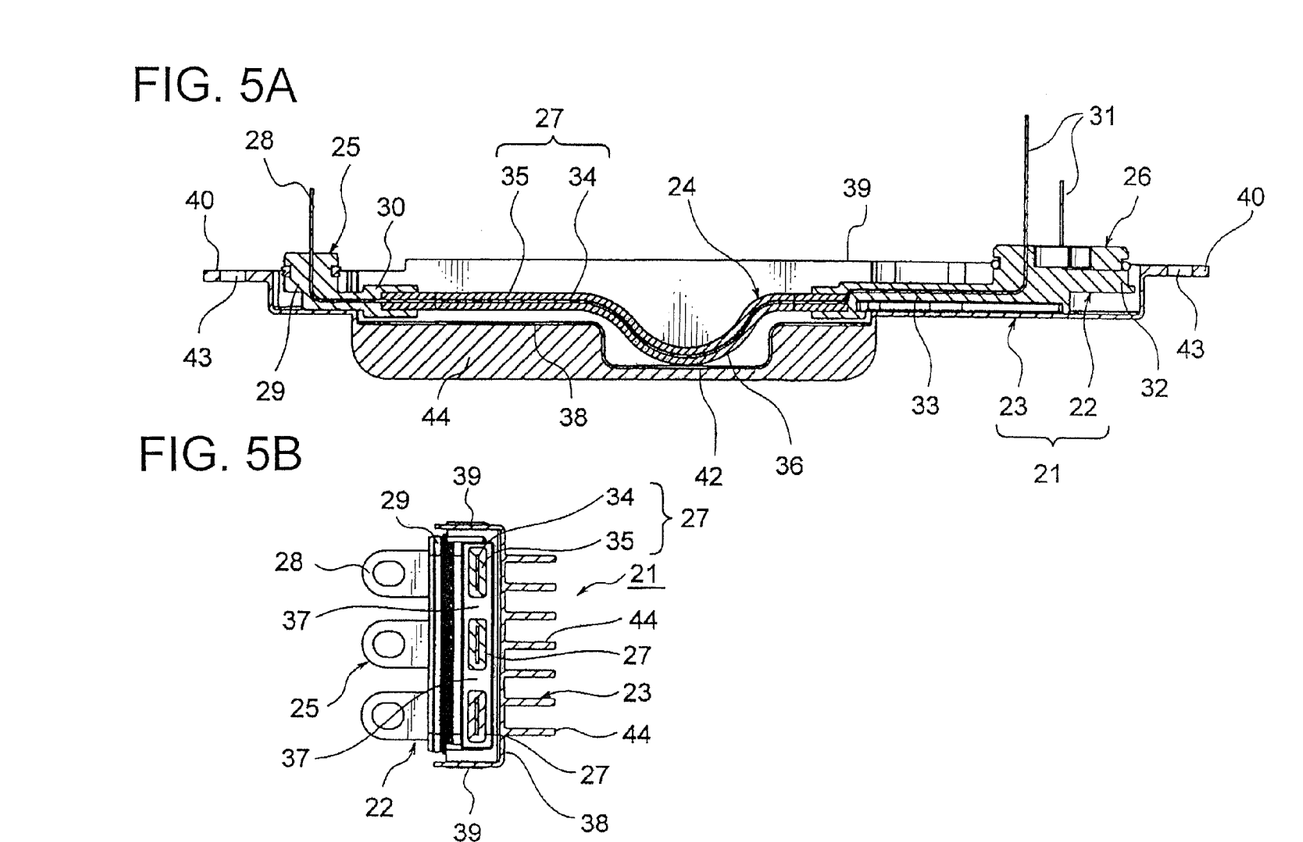
FIG. 5A A sectional view taken on line B-B of FIG. 4B.
FIG. 5B A sectional view taken on line C-C of FIG. 4B.

Hereinafter, an embodiment 2 will be explained with reference to figures. FIG. 4A is a plan view showing the routing structure of the wiring harness. FIG. 4B is a bottom view showing the routing structure of the wiring harness. FIG. 5A is a sectional view taken on line B-B of FIG. 4B. FIG. 5B is a sectional view taken on line C-C of FIG. 4B. Incidentally, the same components as those in the embodiment 1 are assigned with the same reference signs and a detailed explanation is omitted.

As shown in FIGS. 4A to 5B, the routing structure 21 of the wiring harness 22 in the embodiment 2 is different from that in the embodiment 1 at a point that the routing structure 21 of the wiring harness 22 of the embodiment 2 is provided with a plurality of radiator fins 44 on an outer wall of the ceiling wall 38 of the shield cover 23 as known by comparing with FIG. 3. The radiator fin has a large surface area, and is formed in a rib shape extending straight in a longitudinal direction of the shield cover 23. By providing a plurality of radiator this 44, the shield cover 23 radiates heat effectively. Incidentally, the shape of the radiator fin 44 is not limited as long as it has a large surface area. The routing structure of the wiring harness 21 in the embodiment 2 can prevent the wiring harness 22 from high temperature and its influence caused by the heat generation similar to the embodiment 1.

In addition, of course, modification and variation of the present invention is possible without departing from the spirit and the scope of the present invention.

REFERENCE SIGNS LIST 1 hybrid vehicle
2 engine
3 motor unit
4 inverter unit
5 engine room
6 wiring harness
7, 8 shield case
9 fixing leg
21 routing structure of the wiring harness
22 wiring harness
23 shield cover
24 harness main body
25 motor-side connector
26 inverter-side connector
27 high voltage conducting lines
28, 31 terminal
29, 32 housing
30, 33 overmolding portion
34 conductor
35 insulator
36 curved portion
37 gap
38 ceiling wall
39 side wall
40 fixing portion 41 interval
43 convex portion
43 screw hole
44 radiator fin

The invention claimed is:
1. A routing structure of a wiring harness comprising:
the wiring harness comprising:
  a harness main body including a plurality of high voltage conducting lines arranged with gaps therebetween,
  each of the lines having a conductor and an insulator covering the conductor,
  wherein each of the lines is in a flat-plate shape with a curved portion in a corresponding location along the length of each of the lines, the curved portion forming a half arc between portions of two sides of the line which lie in a same plane; and
  a box-shaped conductive shield cover covering the wiring harness on at least three sides,
wherein outer sides of the curved portions away from a center of curvature of the curved portion of the high voltage conductive lines directly contact the box-shaped conductive shield cover at an inner side of the box-shaped conductive shield cover.
2. The routing structure as claimed in claim 1, wherein a part of the shield cover contacting the curved portion of the high voltage conductive lines is convex.

* * * * *